United States Patent
Schacht et al.

(10) Patent No.: US 12,018,501 B2
(45) Date of Patent: Jun. 25, 2024

(54) FORMWORK SYSTEM, COMPRISING A FORM LINING, ON THE REAR SIDE OF WHICH AT LEAST ONE MOLDING ELEMENT IS ATTACHED

(71) Applicant: BASF SE, Ludwigshafen am Rhein (DE)

(72) Inventors: Maik Schacht, Ludwigshafen (DE); Andreas Wuest, Ludwigshafen am Rhein (DE); Robert Leibe, Heidelberg (DE); Sufyan Rasheed, Heidelberg (DE)

(73) Assignee: BASF SE, Ludwigshafen am Rhein (DE)

( * ) Notice: Subject to any disclaimer, the term of this patent is extended or adjusted under 35 U.S.C. 154(b) by 31 days.

(21) Appl. No.: 17/414,542

(22) PCT Filed: Dec. 13, 2019

(86) PCT No.: PCT/EP2019/085103
§ 371 (c)(1),
(2) Date: Jun. 16, 2021

(87) PCT Pub. No.: WO2020/126913
PCT Pub. Date: Jun. 25, 2020

(65) Prior Publication Data
US 2022/0018145 A1    Jan. 20, 2022

(30) Foreign Application Priority Data

Dec. 17, 2018   (EP) ................................. 18213217

(51) Int. Cl.
*E04G 9/02*    (2006.01)
*B33Y 80/00*   (2015.01)

(52) U.S. Cl.
CPC ............ *E04G 9/02* (2013.01); *B33Y 80/00* (2014.12); *E04G 2009/028* (2013.01)

(58) Field of Classification Search
CPC ..... E04G 9/02; E04G 2009/028; E04G 17/14; E04G 9/05
See application file for complete search history.

(56) References Cited

U.S. PATENT DOCUMENTS 3,751,790 A * 8/1973 Frazier .................... E04G 11/12
                                                29/455.1
5,651,910 A * 7/1997 Myers ................. E04G 17/0754
                                                249/189

(Continued)

FOREIGN PATENT DOCUMENTS

CN       201512945 U  *  6/2010  ............. E04G 11/12
CN       105926935 A      9/2016

(Continued)

OTHER PUBLICATIONS

Translation of CN 201512945 U (Year: 2010).*

(Continued)

*Primary Examiner* — Ryan D Kwiecinski
(74) *Attorney, Agent, or Firm* — Faegre Drinker Biddle & Reath LLP

(57) ABSTRACT

The present invention relates to a formwork system (1) comprising a form lining (2) and at least one shaped element (10) which is attached to the rear side (4) of the form lining (2). The form lining (2) and the shaped element (10) have been produced by a 3D printing method. This is preferably carried out in a common 3D printing process, but the form lining (2) and the shaped element (10) can also be produced in separate 3D printing processes, with the shaped element (10) then being attached to the rear side (4) of the form lining (2). This is effected using at least one first fastening element (50). If, by contrast, the form lining (2) and the shaped (Continued)

Figure 1:
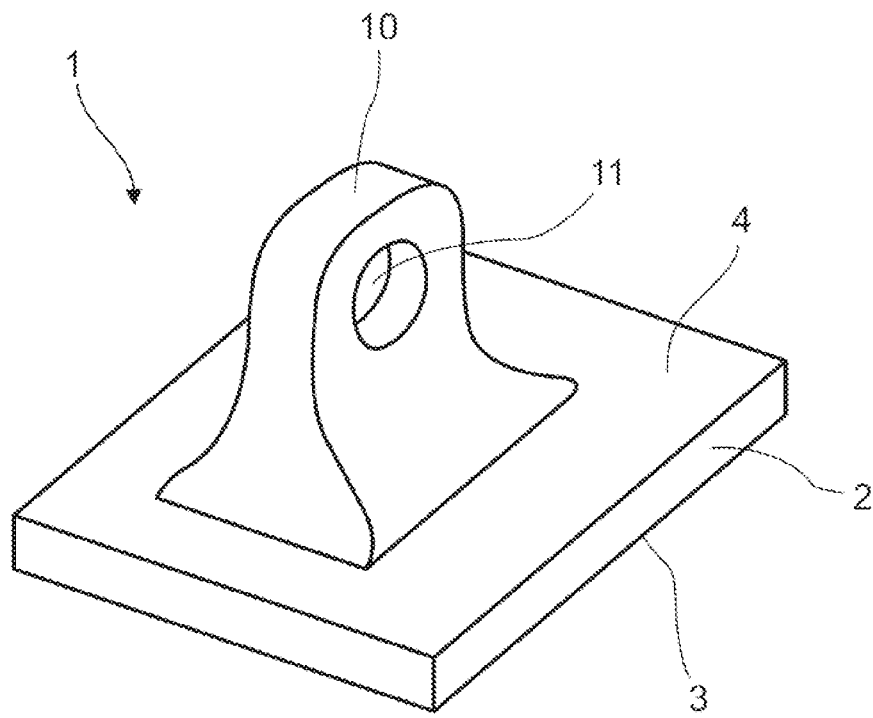

element (10) have been produced in a common 3D printing process, the additional use of a first fastening element (50) for fastening the shaped element (10) to the form lining (2) is not required. According to the invention, the shaped element (10) and optionally the first fastening element (50) are attached to the rear side (4) of the form lining (2) in such a way that they do not touch or pierce the front side (3) of the form lining (2). The present invention also relates to the use of such a formwork system (1), for example in the production of structural elements made of concrete.

7 Claims, 13 Drawing Sheets

(56) References Cited

U.S. PATENT DOCUMENTS

| | | | | |
|---|---|---|---|---|
| 7,243,897 | B2* | 7/2007 | Huber | E04C 5/166 |
| | | | | 249/34 |
| 10,683,656 | B1* | 6/2020 | Van Doren | E02D 27/32 |
| 2007/0200050 | A1* | 8/2007 | Kanao | E04G 9/05 |
| | | | | 249/33 |
| 2009/0057533 | A1* | 3/2009 | Jung | E04G 17/001 |
| | | | | 249/189 |
| 2010/0252714 | A1* | 10/2010 | Hendricks | E04G 11/062 |
| | | | | 249/188 |
| 2016/0001461 | A1* | 1/2016 | Gardiner | B28B 7/346 |
| | | | | 264/219 |
| 2019/0264453 | A1* | 8/2019 | Petri | E04G 11/04 |
| 2019/0292798 | A1* | 9/2019 | Warren | E04G 17/14 |
| 2022/0018145 | A1* | 1/2022 | Schacht | E04G 9/02 |
| 2022/0098857 | A1* | 3/2022 | Van Vlerken | E04G 17/14 |

FOREIGN PATENT DOCUMENTS

| | | | | |
|---|---|---|---|---|
| CN | 108797892 A | | 11/2018 | |
| DE | 102013107303 A1 | | 1/2015 | |
| DE | 102016119365 A1 | * | 4/2018 | B29C 33/3842 |
| DE | 102016119365 A1 | | 4/2018 | |
| DE | 102017129740 A1 | * | 6/2019 | E04G 9/05 |
| EP | 3388219 A1 | | 10/2018 | |
| KR | 10-1539186 B1 | | 7/2015 | |
| WO | 95/02101 A1 | | 1/1995 | |
| WO | WO-2004031511 A1 | * | 4/2004 | E04G 11/10 |
| WO | 2011/035649 A1 | | 3/2011 | |
| WO | 2011/070530 A1 | | 6/2011 | |
| WO | WO-2018068791 A1 | * | 4/2018 | B29C 33/3842 |
| WO | WO-2023089077 A1 | * | 5/2023 | E04G 17/045 |

OTHER PUBLICATIONS

International Preliminary Report on Patentability received for PCT Patent Application No. PCT/EP2019/085103, mailed on Mar. 22, 2021, 25 pages (7 pages of English Translation and 18 pages of Original Document).

International Search Report and Written Opinion received for PCT Patent Application No. PCT/EP2019/085103, mailed on Feb. 13, 2020, 15 pages (2 pages of English Translation and 13 pages of Original Document).

* cited by examiner

Figure 2:
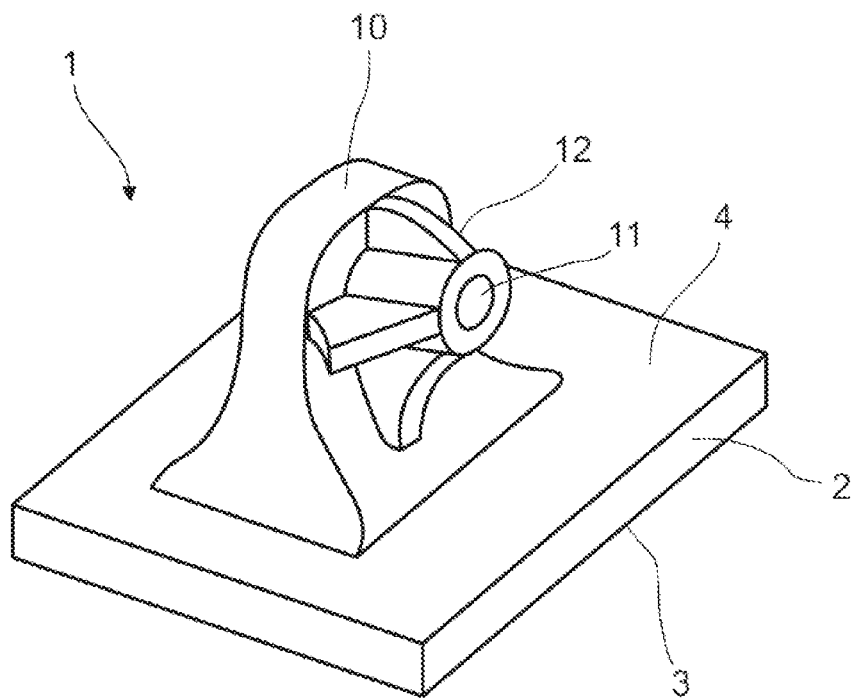

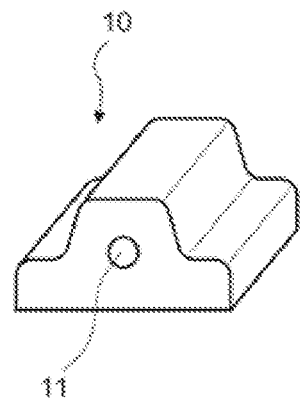 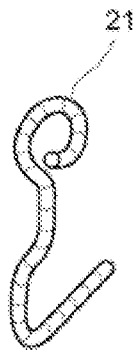
Figure 10A1       Figure 10A2
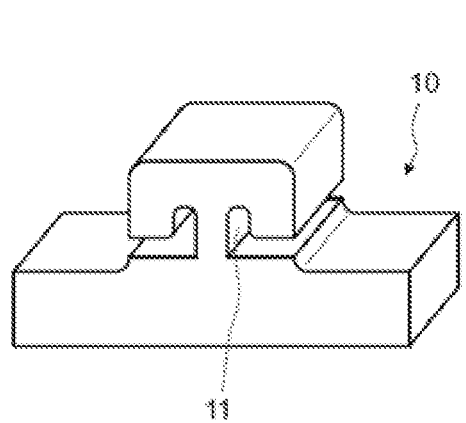 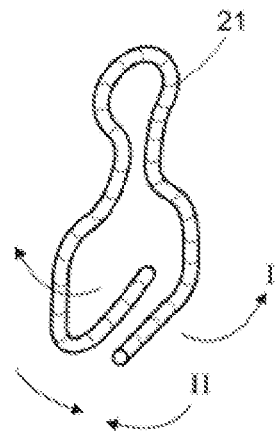
Figure 10B1       Figure 10B2

FORMWORK SYSTEM, COMPRISING A FORM LINING, ON THE REAR SIDE OF WHICH AT LEAST ONE MOLDING ELEMENT IS ATTACHED

CROSS-REFERENCE TO RELATED APPLICATIONS

This application is a national stage application (under 35 U.S.C. § 371) of PCT/EP2019/085103, filed Dec. 13, 2019, which claims benefit of European Application No. 18213217.5, filed Dec. 17, 2018, both of which are incorporated herein by reference in their entirety.

The present invention relates to a formwork system (1) comprising a form lining (2) and at least one shaped element (10) which is attached to the rear side (4) of the form lining (2). The form lining (2) and the shaped element (10) have been produced by a 3D printing method. This is preferably carried out in a common 3D printing process, but the form lining (2) and the shaped element (10) can also be produced in separate 3D printing processes, with the shaped element (10) then being attached to the rear side (4) of the form lining (2). This is effected using at least one first fastening element. If, by contrast, the form lining (2) and the shaped element (10) have been produced in a common 3D printing process, the additional use of a first fastening element for fastening the shaped element (10) to the form lining (2) is not required. According to the invention, the shaped element (10) and optionally the first fastening element are attached to the rear side (4) of the form lining (2) in such a way that they do not touch or pierce the front side (3) of the form lining (2). The present invention also relates to the use of such a formwork system (1), for example in the production of structural elements made of concrete.

Formwork for the production of structural elements made of concrete must be able to withstand large internal pressures with small deformations on account of the high density of concrete. In addition, there are high requirements for an as far as possible undisturbed, uniform surface on the concrete structural element to be produced, with a desired, ideally uninterrupted texture. A homogeneous, undisturbed formwork surface without visible fastening elements such as screws reduces the effort required to rework the formwork and the precast concrete parts. In practice, the formwork systems are as a rule attached to a substructure, with for example screws or other fastening elements, starting from the side of the formwork facing the concrete, being driven through this side in order to achieve fastening to the corresponding substructure. However, this method, which is widespread in practice, has the decisive disadvantage that the fastening elements used are clearly visible on the surface of the concrete structural element to be produced, thus requiring reworking. If, for example, the screws used are provided with filler on their heads, stains on the surface and/or undesired deformations/depressions can still be seen in the corresponding concrete structural element.

WO 95/02101 discloses a conventional formwork system (referred to there as a lining board) in which a supporting beam, which has an approximately U-shaped cross section, is applied to the side of the form lining facing away from the concrete. WO 95/02101 does not contain any specific information about the material from which, or the method by which, the form lining is produced. The supporting beam with an approximately U-shaped cross section can be produced from sheet metal, for example.

DE-A 10 2016 119 365 relates to a modular formwork system for the production of concrete elements. The associated figures show, inter alia, how a concrete element is produced in practice, with a formwork system first having to be custom-made and the formwork system in turn having to be fastened to a supporting structure or substructure. The aluminum formwork panels that are frequently used in practice are described there as disadvantageous on account of the texture problem on the concrete surface. The modular formwork system disclosed there is instead composed of a plurality of individual forms, the individual forms being produced, at least on the surface facing the concrete, from a plastic which is cured in layers. This surface is in turn applied to (individual) base plates, which can be manufactured from aluminum, for example. In practical use, this modular formwork system, composed of a large number of individual forms, is in turn fastened to a framework or a substructure on the rear side, that is to say on the side facing away from the concrete. For this purpose, use is generally made of devices for fixing the individual elements that are separately attached to the rear side of the base plates produced, for example, from aluminum.

CN 105 926 935 A discloses an integrated column template for concrete placement based on 3D printing, the integrated column template being a tubular structure formed by 3D printing, which consists of a tube wall and optionally reinforcing ribs.

KR 101 539 186 B1 relates to a formwork arrangement for pouring concrete with a specific outer surface, which comprises a frame and counterparts corresponding to the outer surface of the concrete to be poured.

CN 108 797 892 A discloses a freely removable concrete column form reinforced with a glass fiber mesh, the column form containing a hollow ultra-high-performance concrete layer and a glass fiber mesh.

The object on which the present invention is based is to provide a new formwork system which is suitable for producing structural elements made of concrete.

The object is achieved by a formwork system (1) comprising
  a form lining (2) which has a front side (3) and a rear side (4),
  at least one shaped element (10) which is attached to the rear side (4) of the form lining (2),
wherein i) the form lining (2) and the shaped element (10) have been produced by a 3D printing method, ii) the shaped element (10) is attached to the rear side (4) of the form lining (2) optionally using at least one first fastening element, and iii) the shaped element (10) and optionally the first fastening element are attached to the rear side (4) of the form lining (2) in such a way that the shaped element (10) and the optionally used first fastening element do not touch or pierce the front side (3) of the form lining (2).

One key advantage of the formwork systems according to the invention can be seen in the fact that they have a very high degree of flexibility with regard to the manner of connection to the corresponding substructure. In this way, different expansion or shrinkage behaviors of the respectively used materials due to temperature extremes such as heat or cold can be easily compensated for.

A further key advantage can be seen in the fact that, in the case of the concrete structural element to be produced, an undisturbed and/or uniform surface with a desired, ideally uninterrupted texture can be produced in a simple manner. This is achieved in particular by the fact that in the formwork system (1) according to the invention the complete form lining (2) and the shaped elements (10) have been produced by a 3D printing method. Advantageously, the complete form lining (2) and/or the shaped elements (10) are each produced by a single 3D printing process. The individual elements of the formwork system (1) according to the invention no longer have to be laboriously assembled from a plurality of individual elements, as is required, for example, in the method according to DE-A 10 2016 119 365. The formwork systems (1) according to the invention can be produced particularly easily if the form lining (2) and the at least one shaped element (10) have been produced in a common 3D printing process.

The 3D-printed formwork systems (1) according to the invention are specifically suitable for creating particularly complex geometrical structural elements that cannot be produced with conventional formwork elements (such as, for example, panel, tube, wax or polyurethane foams) or can be produced only with a very high level of effort by hand or with CNC milling. The formwork systems according to the invention also generally have a lower mass and/or production time, since they can be produced in the form of relatively thin form linings (for example 1 to 20 mm thick). The preferably thin-walled formwork systems according to the invention can be attached in a simple and flexible manner to a corresponding substructure consisting of stiff, load-bearing elements such as wooden lattice constructions, in order to thus be able to withstand high pressures when pouring or compacting the filling medium (in particular concrete) without inadmissible/significant deformations.

The formwork systems according to the invention, given their flexible ease of handling, also no longer have to be adhesively bonded to the substructure, which is still a widespread method in practice. This adhesive bonding is usually very expensive, time-consuming and, with the adhesive, introduces a new medium into the production process that may have to be disposed of separately later. In addition, relatively large amounts of adhesive must be used in order to achieve a stable connection. Furthermore, subsequent dismantling is made more difficult.

Nor do the formwork systems according to the invention require screwing from the inside (the side facing the concrete) of the formwork system to the substructure, as is done in practice as an alternative to adhesive bonding. Accordingly, the use of the formwork system according to the invention allows a situation in which, in the precast concrete part to be produced, no screw heads, holes or other guides on the surface of the form lining show on the precast concrete part to be produced. Any disturbance to the surface/texture of the precast concrete part is thus prevented and no subsequent additional filling and/or smoothing measures need to be carried out on the precast concrete part produced. It must also be taken into account here that any filler materials to be used in this connection have a different suction behavior than the shuttering materials, which also leads to a visible disturbance on the concrete surface. This is particularly important for facing concrete applications.

The formwork system according to the invention is defined in more detail below.

A first subject of the present invention is a formwork system (1) comprising
    a form lining (2) which has a front side (3) and a rear side (4),
    at least one shaped element (10) which is attached to the rear side (4) of the form lining (2),
wherein i) the form lining (2) and the shaped element (10) have been produced by a 3D printing method, ii) the shaped element (10) is attached to the rear side (4) of the form lining (2) optionally using at least one first fastening element, and iii) the shaped element (10) and optionally the first fastening element are attached to the rear side (4) of the form lining (2) in such a way that the shaped element (10) and the optionally used first fastening element do not touch or pierce the front side (3) of the form lining (2).

3D (three-dimensional) printing methods as such are known to those skilled in the art. According to the invention, in principle, all known different 3D printing techniques, such as for example selective laser melting, electron beam melting, selective laser sintering, stereolithography or the fused deposition modeling (FDM) method, can be used. The same applies analogously to the corresponding starting materials such as powder or filaments, which are applied layer by layer in the respective 3D printing method in order to produce the desired three-dimensional (3D) object.

According to the invention, the complete formwork system (1) comprising a form lining (2) and at least one shaped element (10) is produced by a 3D printing method. In addition, individual functional elements (40) can also be produced by a 3D printing method. However, it is also possible that in the formwork system (1) according to the invention individual shaped elements, functional elements or other objects have not been produced by a 3D printing method. For example, the formwork system (1) according to the invention, in addition to at least one shaped element (10) which is attached to the rear side (4) of the form lining (2) and which has been produced by a 3D printing method, can also comprise further shaped elements which have not been produced using a 3D printing method. According to the invention, the first and second fastening elements (20/50) or the substructure (30) are generally not produced by a 3D printing method because this would be too complex. Theoretically, however, it is also possible to produce such objects likewise by a 3D printing method.

According to the invention, it is preferred that the respective elements of the formwork system (1) which are produced by a 3D printing process, that is to say in particular the form lining (2) and the at least one shaped element (10), are each produced by a single 3D printing process. In other words, this means that it is preferred according to the invention that the respective components of the formwork system (1) according to the invention that have been produced by a 3D printing method are each produced in one piece and do not consist of different parts which then have to be laboriously joined together.

In a particularly preferred embodiment of the present invention, the formwork system (1) is configured in such a way that the form lining (2) and the at least one shaped element (10) have been produced in a common 3D printing process.

According to the invention, however, it is possible that the form lining (2) and the at least one shaped element (10) are each produced in separate 3D printing processes, but preferably the form lining (2) and the at least one shaped element (10) are produced in a common 3D printing process.

If, in the formwork system (1) according to the invention, the form lining (2) and the at least one shaped element (10) have each been produced in separate 3D printing processes, the shaped element (10) is then attached to the rear side (4) of the form lining (2) using at least one first fastening element. Suitable in principle here as first fastening element are the same fastening elements as those explained in detail below as second fastening element (20), for example for attaching the formwork system (1) according to the invention to the substructure (30). The use of adhesives known to a person skilled in the art is also suitable as first fastening elements, but these are less suitable according to the invention when attaching the formwork system (1) and the substructure (30).

If first fastening elements are used to subsequently attach the shaped elements (10) to the form lining (2), care must be taken to ensure that neither the first fastening element nor the shaped element (10) touches or pierces/destroys the front side (3), that is to say the inner side or the side facing the concrete in practical use. Accordingly, it it is expedient for this embodiment of the present invention to additionally print one or more domes on the rear side (4) of the form lining (2) during the 3D printing operation in order to avoid destroying the front side (3) of the form lining (2), in particular by the use of first fastening elements.

In this embodiment, it is preferred that the at least one shaped element (10) is attached to the rear side (4) of the form lining (2) by adhesive bonding, screwing, nailing and/or riveting, and/or, as first fastening element, adhesive, screws, nails and/or rivets are used. This is particularly preferably effected by screwing, and/or screws are used as first fastening element.

For the sake of completeness, it should be noted that in the preferred embodiment of the present invention, in which the form lining (2) and the at least one shaped element (10) have been produced in a common 3D printing process, the feature whereby the shaped element (10) does not touch or pierce the front side (3) of the form lining (2) is already automatically satisfied, because the form lining (2) and the at least one shaped element (10) form the formwork system (1) according to the invention together and cannot be separated from one another. Subsequent attachment of the shaped element (10) to the rear side (4) of the form lining (2) using at least one first fastening element, as a result which the front side (3) of the form lining (2) can also be touched or pierced, is therefore no longer necessary. In other words, this means that the corresponding shaped elements (10) are already printed directly onto one side of the form lining (2), this side being by definition the rear side (4), that is to say the side facing away from the concrete during use.

In all embodiments of the present invention, the front side (3) of the form lining (2) continues to be preferably completely free of any shaped elements (10), first and second fastening elements (20/50) or other elements such as functional elements (40). Furthermore, regardless of the specific embodiment, the front side (3) of the form lining (2) is not touched or pierced by any other first and second fastening elements (20/50) or functional elements (40). If, for example, functional elements (40) and/or parts of the substructure (30) are connected to the shaped elements (10) attached to the rear side (4) of the form lining (2) via first and second fastening elements (20/50) in any form, none of these elements touches or pierces the front side (3) of the form lining (2).

In the formwork system (1) according to the invention, both the form lining (2) and the at least one shaped element (10) can have any desired geometries and/or sizes (dimensions). The precise size and/or shape/geometry is ultimately determined by a person skilled in the art on the basis of the specific application, that is to say the specific configuration of the molded concrete part to be produced. For this purpose, a person skilled in the art advantageously uses a corresponding computer control or a computer program. The larger the shape/circumference of the form lining (2) in the formwork system (1) according to the invention, the more shaped elements (10) a person skilled in the art will attach to the rear side (4) of the form lining (2) in order to allow the formwork system (1) according to the invention to be attached as stably as possible to the corresponding substructure (30). Particularly in the case of very small molded concrete parts, it is theoretically possible that a single shaped element (10) is already sufficient. In practice, however, the formwork systems (1) according to the invention can also have a large number of shaped elements (10), for example 2, 5, 10, 50, 100 or even more. The geometry and/or size of the individual shaped elements (10) can be the same or different, with preferably all shaped elements (10) according to the invention being the same with regard to their size and/or geometry.

In the formwork system (1) according to the invention, the form lining (2) generally has in practice an average thickness of 1 to 20 mm, preferably 3 to 8 mm. However, these thickness values can by all means also be fallen short of or exceeded For example, in individual applications it is also expedient to make individual regions of the form lining thicker than other regions.

The form lining as such and/or the shaped element (10) as such are known to a person skilled in the art. They can be made from any desired materials known to a person skilled in the art that can be processed in the context of a 3D printing process.

For the purposes of the present invention, the shaped element (10) is understood in principle to mean the element which, via suitable first and second fastening elements (20/50), allows the force fit or form fit between the form lining (2) and the substructure (30). Here, the shaped element (10) has already preferably been created in one piece with the form lining (2) in the same 3D printing process. For the purposes of the present invention, suitable shaped elements (10) can be, for example, an opening, a slot, a cutout, a projection, a reinforcing rib or a latching lug.

In the present invention, a shaped element (10) is preferred which
i) has at least one opening (11), preferably in the form of a round hole, a slot or a cutout, and/or
ii) has at least one latching lug (13), and/or
iii) has at least one reinforcing rib (12).

According to the invention, the formwork system (1) can be connected to a substructure (30) or a subregion thereof. This is usually effected using at least one second fastening element (20). The fastening or connection can be carried out by all methods known to a person skilled in the art.

It is preferred here that the formwork system (1) is fastened to at least one subregion of a substructure (30) using at least one second fastening element (20), with preferably the substructure (30) being at least partially, more preferably completely, produced from wood, with in particular the substructure (30) being a wooden lattice construction or a cleat construction.

In one embodiment of the present invention, a formwork system (1) is used, wherein at least one shaped element (10) has at least one opening (11), preferably a round hole or a slot, and at least one first second fastening element (20), preferably a wire (21), a cable or a steel strip, in particular a wire (21), is inserted, by way of one subregion thereof, into the opening (11) or partially pulled through, and the first second fastening element (20), by way of another subregion thereof, is fastened to the substructure (30) using at least one second second fastening element (20), preferably a screw or a nail.

An alternative embodiment of the present invention relates to a formwork system (1) in which at least one shaped element (10) has at least one opening (11), and the shaped element (10) is attached to the substructure (30) using at least one first second fastening element (20), wherein i) the first second fastening element is fastened to the substructure (30) optionally using at least one second second fastening element (20), preferably a screw (22) or a nail, and/or ii) the first second fastening element is preferably a perforated strip (27), and the perforated strip (27) is fastened to the shaped element (10) optionally using a bolt (26).

According to the invention, a subregion of the formwork system (1) according to the invention can be fastened to a subregion of the substructure (30) either once or else multiply, for example by means of a double-sided connection. Double-sided connections are frequently preferred because in this way a very stable, in particular form-fitting, connection of the formwork system (1) with the corresponding subregion of the substructure (30) can take place. According to the invention, a formwork system (1) is thus preferred in which at least one first shaped element (10) and one second shaped element (10) are attached to the rear side (4) of the form lining (2) in order to establish a double-sided connection with a subregion of the substructure (30), with preferably the arrangement of the first with respect to the second shaped element (10) being symmetrical, preferably mirror-inverted, (relative to the positioning of the substructure (30)).

In a preferred embodiment, the formwork system (1) according to the invention is configured in such a way that the first and second shaped element (10) are each connected to one subregion of a single second fastening element, and a further subregion of this second fastening element is fastened to the substructure (30), wherein preferably i) the substructure (30) has at least one opening and/or cutout through which the second fastening element can be pulled or partially inserted, and/or ii) the second fastening element is a strip, cable or perforated strip, and/or iii) the second fastening element additionally has a tensioning mechanism (24), in particular an eccentric.

As already mentioned above, the formwork system (1) according to the invention can also be connected to a functional element (40) via at least one shaped element (10), wherein the functional element (40) can optionally be produced by a 3D printing method. Functional elements (40) are, however, preferably not produced by a 3D printing method, but rather understood, produced and/or connected to the substructure (30) as a supplement, subset or constituent part thereof. Functional elements as such are known to a person skilled in the art. They are in particular those device elements as presented below in the figures.

Preferred formwork systems (1) of the present invention are configured in such a way that at least one shaped element (10) is connected to a functional element (40), with preferably the shaped element (10) having at least one opening (11), with more preferably the opening (11) being in the form of a cutout, in particular in the form of a dovetail, and/or the functional element (40) has a lower part (42) and an upper part (43) with at least one hole (41).

Furthermore, it is preferred that i) the at least one shaped element (10) and the at least one functional element (40) are connected to one another in a form-fitting manner, preferably according to the key-lock principle, and/or ii) the at least one functional element (40) is connected to a subregion of the substructure (30), preferably using at least one second fastening element (20), in particular a screw or a nail.

In a further preferred embodiment of the present invention, the formwork system (1) is configured in such a way that at least one first shaped element (10) and one second shaped element (10) are attached to the rear side (4) of the form lining (2), wherein i) the first and the second shaped element (10) each have at least one latching lug (13), ii) the first and second shaped element (10) are arranged on the rear side (4) of the form lining (2) in a mirror-inverted manner with respect to one another (relative to the positioning of the substructure (30)), and iii) the first and second shaped element (10) can be reversibly pressed apart and pressed together.

Formwork systems (1) are particularly preferred here in which the first and second shaped element (10) are fastened to the subregion of a substructure (30) or of a functional element (40), preferably to a substructure (30), with the formation of a reversible or releasable snap connection, wherein the substructure (30) or the functional element (40) has at least one cutout (31/44) into which at least one latching lug (13) of the first and/or the second shaped element (10) can latch with the formation of a snap connection.

A further subject of the present invention is the use of a formwork system (1), as described above, in concrete construction and/or for the production of structural elements made of concrete, wherein the front side (3) of the form lining (2) is the side of the formwork system (1) facing the concrete.

Figure 3:
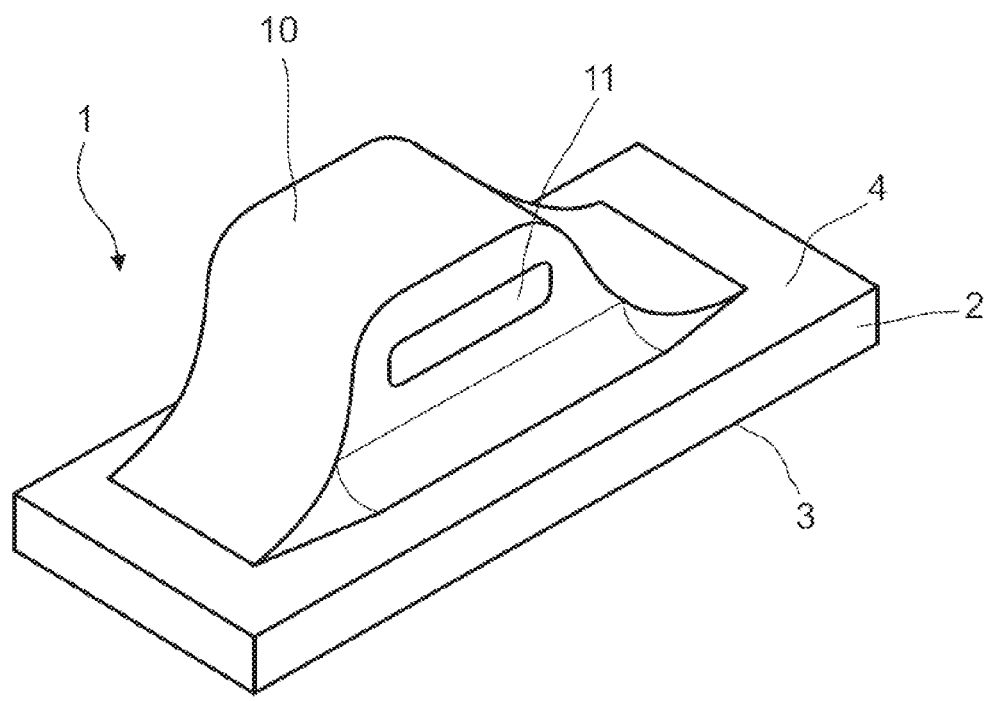

The formwork system (1) according to the invention is schematically illustrated below with reference to the figures. Furthermore, individual figures also depict components and/or constituent parts of the formwork system (1) according to the invention, and also preferred embodiments and/or application examples of the formwork system (1) according to the invention. In addition, a formwork system according to the prior art is also shown. The objects shown in the individual figures are generally not depicted true to scale. This applies, for example, to the size and/or the shape of the form lining (10), in particular in relation to the size, shape and/or number of the shaped element (10). Specifically:

FIG. 1 depicts a formwork system (1) according to the invention, the shaped element (10) of which has, by way of example, a special geometry. Exemplary variants with regard to a specific (special) configuration of the shaped element (10) are shown in FIGS. 2 and 3.

FIG. 4A shows the formwork system according to the invention connected to a substructure on the rear side of the form lining. FIG. 4B shows a fastening element in accordance with one embodiment of the disclosure. FIG. 5, by contrast, corresponds to the application of a formwork system according to the prior art.

Figure 6:
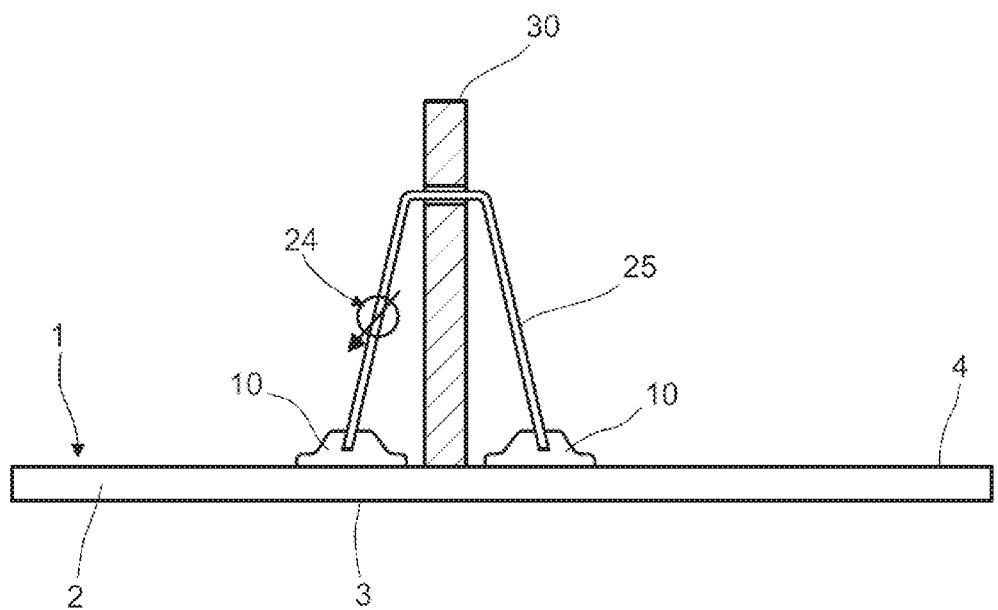
Figure 7:
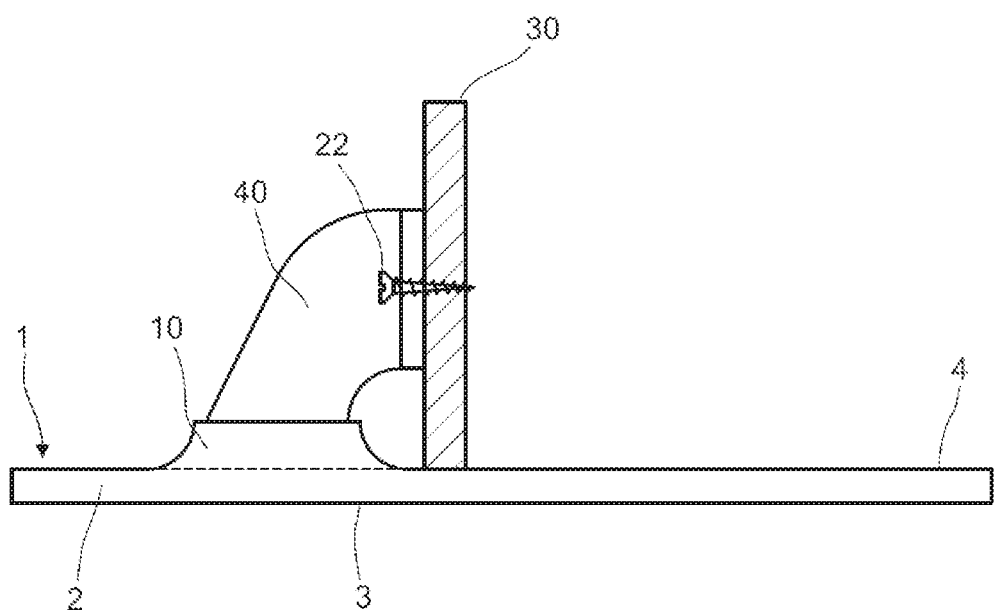

FIG. 6 shows a variant in the application of a formwork system (1) according to the invention. A further variant of this is shown in FIG. 7, with a functional element (40) additionally being present in this variant.

Figure 8A:
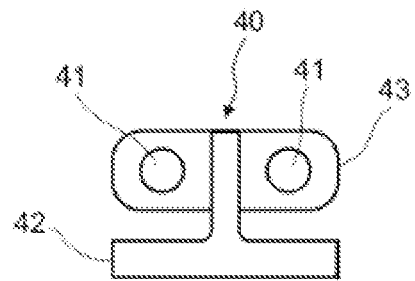
Figure 8C:
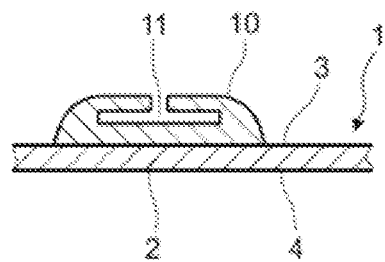
Figure 8B:
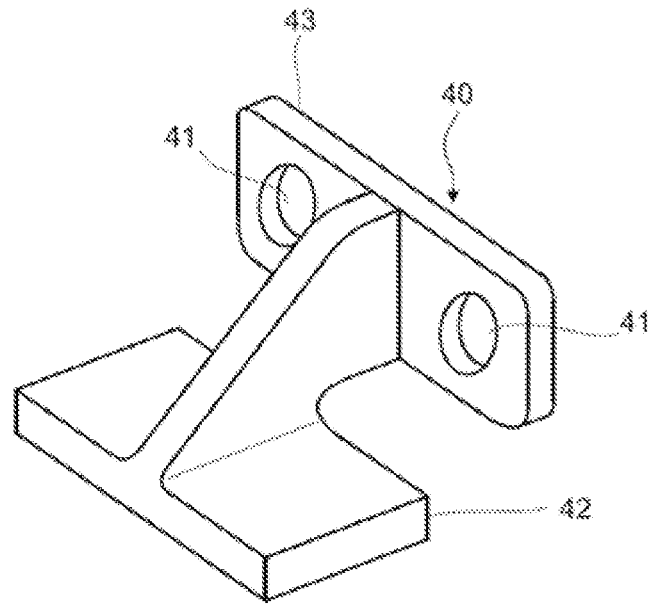

FIG. 8A shows an example of a functional element in accordance with one embodiment of the disclosure. FIG. 8B show an example of a functional element in accordance with one embodiment of the disclosure. FIG. 8C shows an example of a formwork system according to one embodiment of the invention.

Figure 9A:
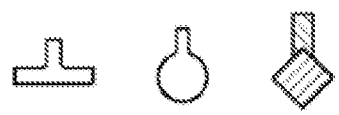
Figure 9B:
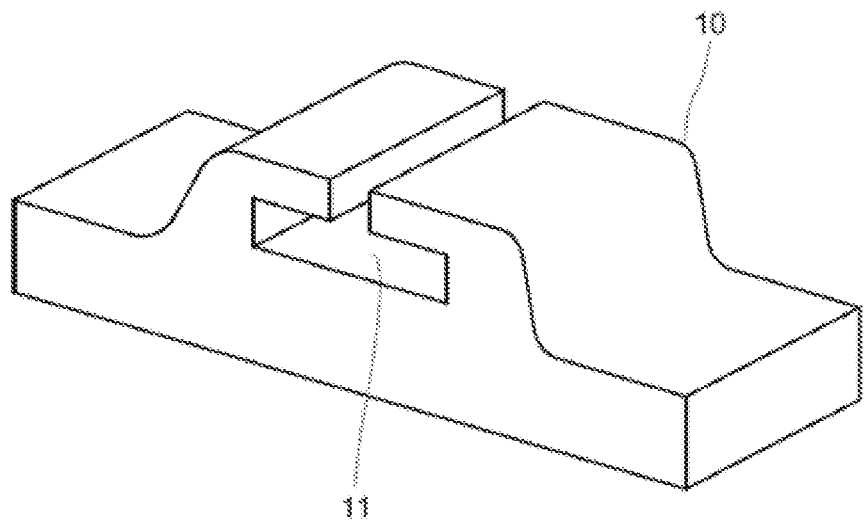

FIG. 9A shows several geometric elements in accordance with embodiments of the disclosure. FIG. 9B shows an embodiment of a shaped element in accordance with one embodiment of the disclosure. FIG. 10A1 shows a shaped element in accordance with one embodiment of the disclosure. FIG. 10A2 shows a second fastening element in accordance with one embodiment of the disclosure FIG. 10B1 shows a shaped element in accordance with one embodiment of the disclosure. FIG. 10B2 shows a second fastening element in accordance with one embodiment of the disclosure.

Figure 11:
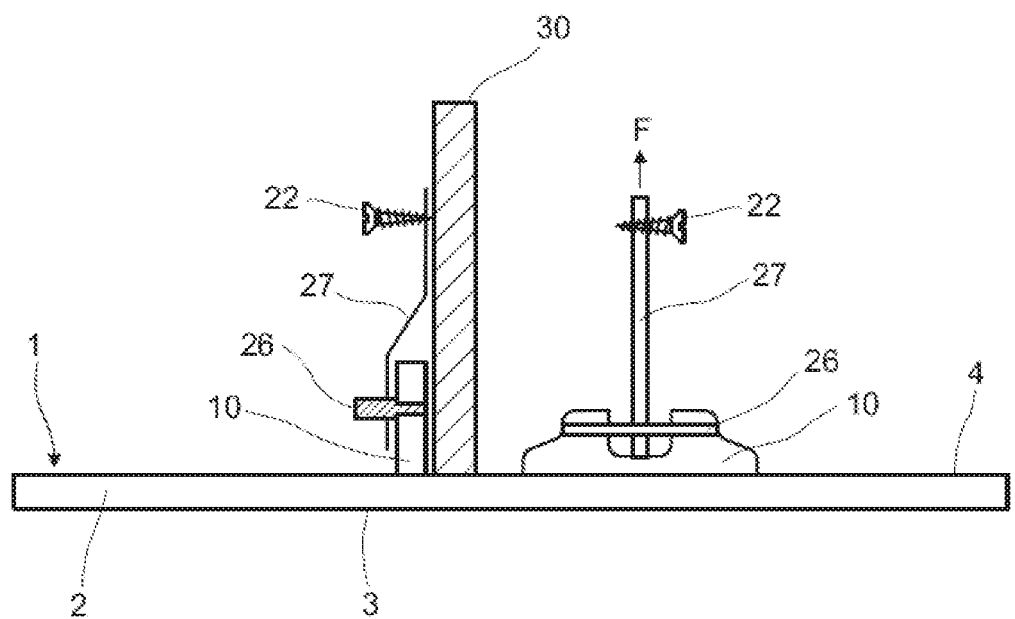
Figure 12:
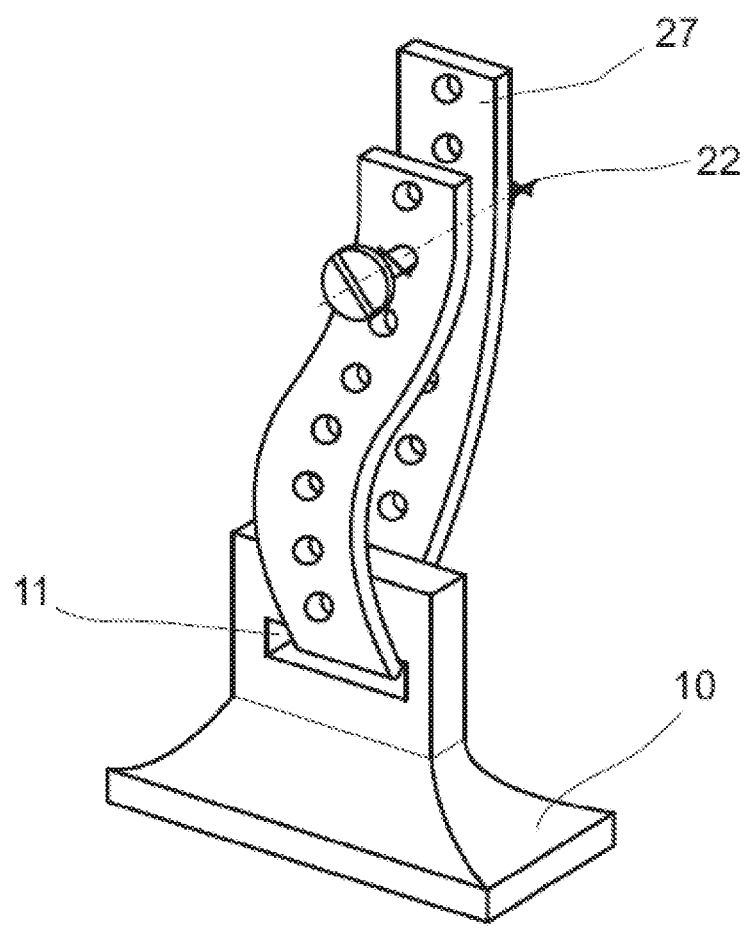

FIG. 11 in turn shows a special application of a formwork system (1) according to the invention using a perforated strip (27) as second fastening element (20). FIG. 12 shows an alternative embodiment of this shaped element (10) used in this embodiment.

Figure 13:
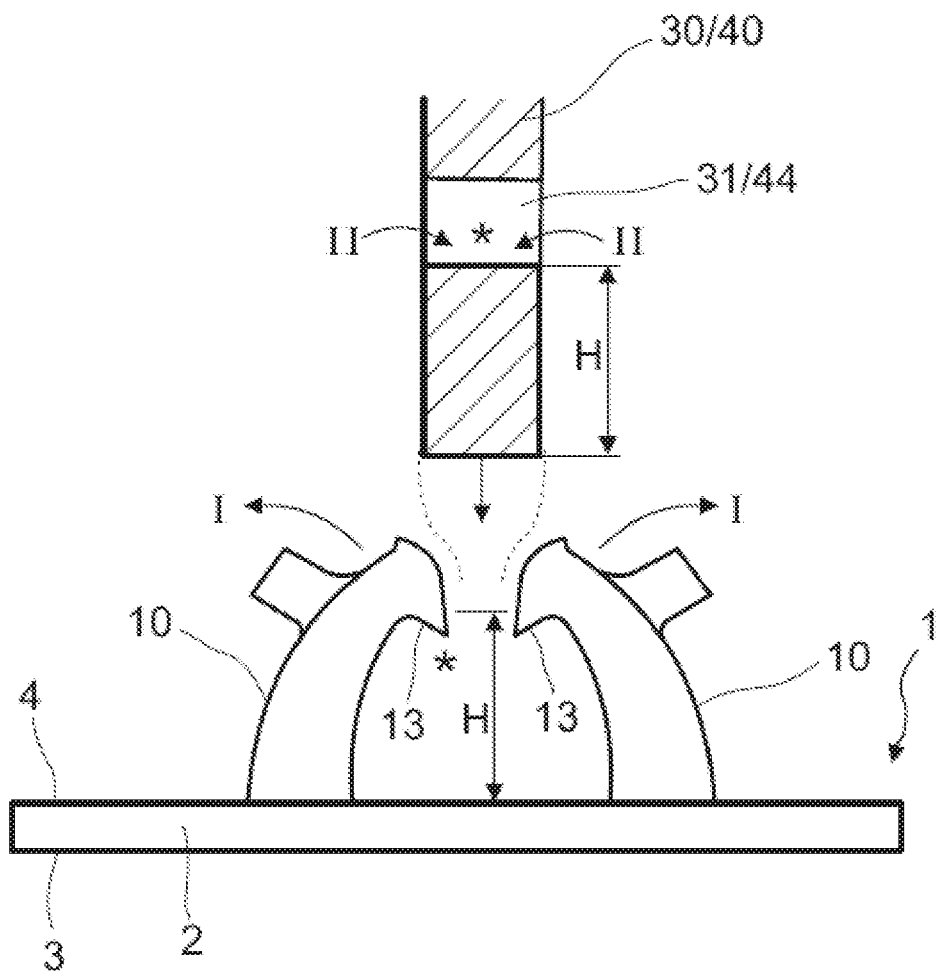
Figure 14A:
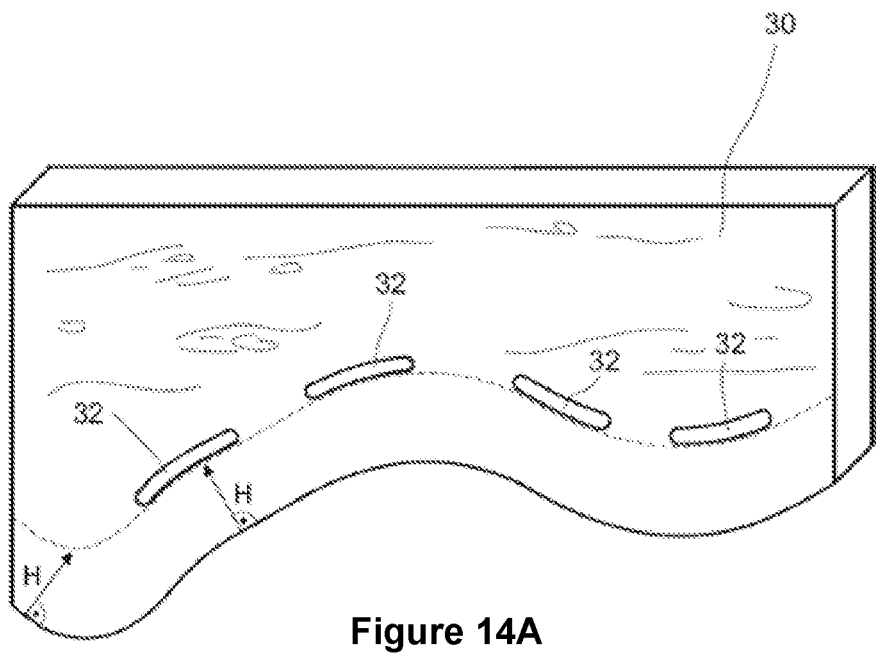
Figure 14B:
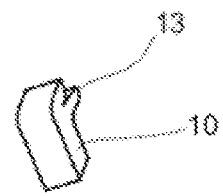
Figure 14C:
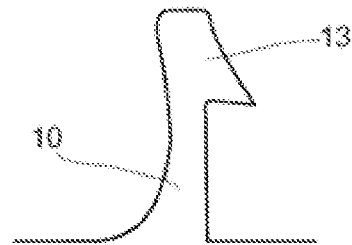

FIG. 13 shows a further embodiment of the formwork system (1) according to the invention with the formation of a snap connection. FIG. 14A shows an embodiment of a snap connection in accordance with one embodiment of the disclosure. FIG. 14B shows an isometric view of a shaped element in accordance with one embodiment of the disclosure. FIG. 14C shows an side view of a shaped element in accordance with one embodiment of the disclosure.

In FIG. 1, the formwork system (1) according to the invention is illustrated schematically in a first embodiment. The form lining (2) can have any desired geometry. The rectangular form lining geometry shown in FIG. 1 is only to be understood by way of example. The same also applies analogously to the size (dimension) of the form lining (2). In the illustration according to FIG. 1, a shaped element (10), which in turn has an opening (11), is attached to the rear side (4) of the form lining (2). In practice, two or more shaped elements (10) can also be attached to the rear side (4) of the form lining (2). The specific number of such shaped elements (10) on the rear side (4) of the form lining (2) is generally determined by the specific application, that is to say the size and/or geometry of the shaped element to be produced in particular from concrete. The front side (3) of the form lining (2) is also referred to as the outer side or concrete side, since it comes into contact, for example, with the mortar used in the specific application. The rear side (4) is also referred to in practice as the inner side.

The opening (11) shown in the shaped element (10) of FIG. 1 is specifically configured there as a (round) hole. The size and/or shape/geometry of the opening (11) can ultimately be chosen in any desired manner. As a rule, they are based on the specific practical application. The same also applies analogously to the specific geometry and/or size of the shaped element (10). Variants of the exemplary representation of a shaped element (10) according to FIG. 1 and/or of the opening (11) are shown in FIGS. 2 and 3. Thus, for example, in the shaped element according to FIG. 2, the region of the shaped element (10) forming the opening (11) has been lengthened in comparison to the corresponding opening of the shaped element according to FIG. 1. In addition, reinforcing ribs (12) are attached to this shaped element according to FIG. 2 in the region of the opening (11). The number and/or specific geometry of such reinforcing ribs are arbitrary in practice. They serve primarily to increase the load in the specific application of the formwork system (1) according to the invention in practice.

A variant of the geometry of the opening (11) in the form of a slot-shaped opening is shown in FIG. 3. It is also possible for the shaped element (10) to have two or more openings (11), in particular hole-shaped openings, that is to say round holes. Such additional holes are used to compensate for tolerances.

In the formwork systems (1) according to the invention that are shown schematically and by way of example in FIGS. 1 to 3, both the form lining (2) and the shaped element (10) are produced by a 3D printing method. Here, the form lining (2) and the at least one shaped element (10) can be produced in the context of a single/common 3D printing process or else separately from one another, with the at least one shaped element (10) being attached to the rear side (4) of the form lining (2) following the respective 3D printing method of the form lining (2). Preferably, within the scope of the present invention, the formwork system (1), comprising a form lining (2) and at least one shaped element (10), is produced by a common 3D printing process. It is also possible for two or more shaped elements (10) of different geometry and/or size to be attached to the rear side (4) of the form lining (2). It is equally possible, in the case of two or more shaped elements (10), for one subset of the respective shaped elements (10) to be produced in the context of a common 3D printing process with the form lining (2), while another subset of the shaped elements (10) is attached to the rear side (4) of the form lining (2) only following the 3D printing process of the form lining.

Figure 4:
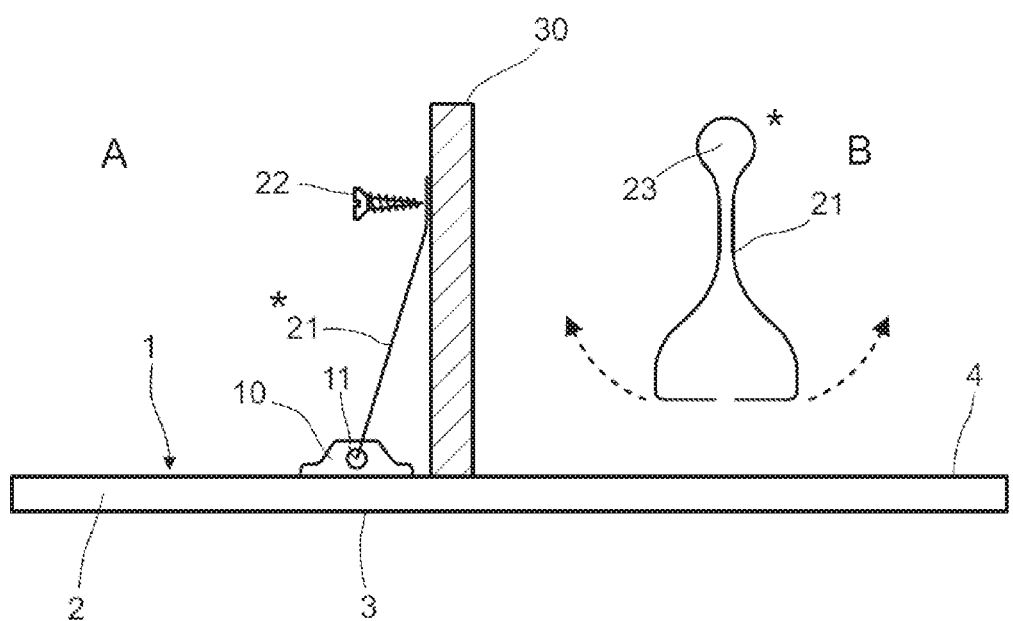
Figure 5:
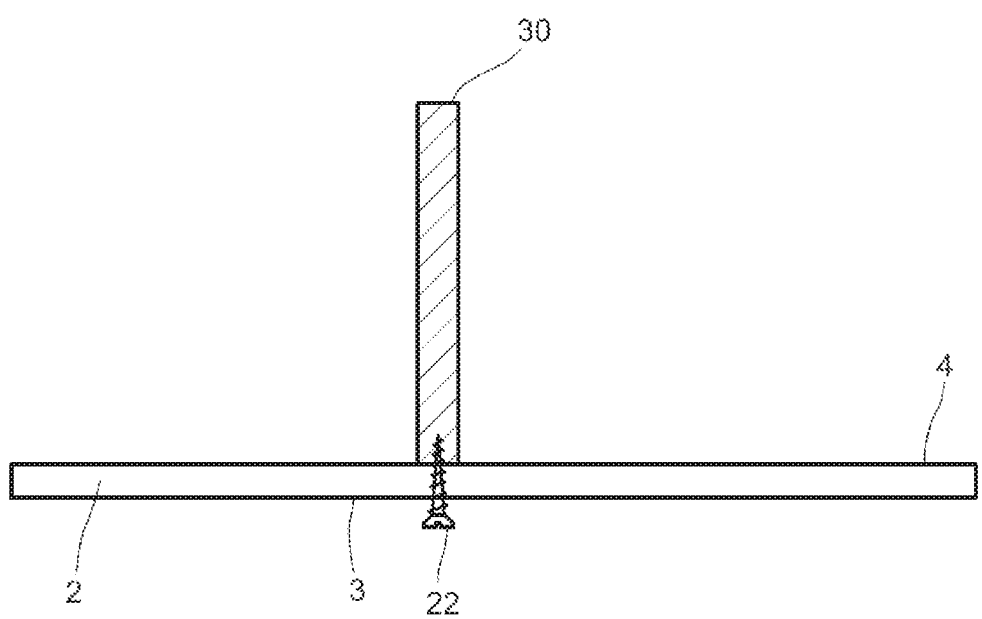

FIG. 4 schematically shows a possible application of the formwork system (1) according to the invention in practice. Section A of FIG. 4 shows how the formwork system (1) according to the invention is connected to a substructure (30) on the rear side (4) of the form lining (2). The substructure (30) can be produced from wood, for example.

In FIG. 4, the substructure (30) is shown schematically only as a single piece (subregion). In practice, the corresponding substructures generally comprise a plurality of such elements, which can be connected to one another in any desired geometric arrangement. This means that in practice the formwork system (1) according to the invention can analogously also be connected to the corresponding constituent parts of the substructure (30) at two or more points, as is shown singly (for a subregion) by way of example in FIG. 4.

In the embodiment shown by way of example in FIG. 4, one shaped element (10), as is shown by way of example in FIG. 1, is used on the rear side (4) of the form lining (2). A first fastening element in the form of a wire (21) is guided through the round/hole-shaped opening (11) of the shaped element (10). Instead of a wire, an analogous fastening element such as a cable or a steel strip can alternatively be used. This first fastening element (21) is in turn attached to the substructure (30) by a second fastening element, in the present case in the form of a screw (22). In FIG. 4B, this detail of FIG. 4A, marked by an asterisk, is shown schematically rotated through 90°. As can be clearly seen from FIG. 4B, the first fastening element, in particular the wire (21), can be shaped in such a way that it is inserted into the opening (11) of the shaped element (10) in its lower region from two sides. At its upper end, the first fastening element, in particular the wire (21), is configured, for example in the form of a screw hole (23), such that it can be stably fastened to the substructure (30) by the second fastening element (in particular a screw (22)). Instead of a screw (22), another suitable fastening element, such as for example a nail, can also be used.

The variant of the one-sided fastening shown in FIG. 4, in particular the one-sided screw connection, can also be modified in a simple manner to the effect that a two-sided fastening, in particular a two-sided screw connection, of the formwork system (2) according to the invention with the corresponding region of the substructure (30) is carried out, with a second shaped element (10) being attached to the form lining (2) symmetrically, preferably in a mirror-inverted manner (relative to the subregion of the substructure (30) shown in FIG. 4) with respect to the first shaped element (10). In this variant, the second fastening is therefore attached on the side of the subregion of the substructure (30) opposite the first fastening side.

FIG. 5 shows an analogous application of a formwork system according to the prior art. The corresponding formwork system lies in subregions of its rear side (that is to say the inner side or the side facing away from the concrete) on a subregion of the corresponding substructure or touches the latter. According to the prior art, the form lining is generally fastened by attaching a fastening element, in particular a screw (22). Here, the corresponding fastening element is first positioned on the front side (3), that is to say the outer side or concrete side of the form lining (2), in such a way that the corresponding fastening element (22) pierces/penetrates the form lining (2) over its entire thickness by applying a corresponding force movement, for example by means of screwing, and is furthermore introduced into the subregion of the substructure (30) adjoining the form lining. In the specific embodiment of the prior art according to FIG. 5, this is effected by tightly screwing the form lining (2) to the substructure (30) using (by) at least one screw (22). The particular disadvantage with this fastening method according to the prior art is that the corresponding fastening element completely pierces the respective form lining (2) over its entire thickness, with the result that the head of the screw (22) also remains visible from the front side (3) of the corresponding form lining (2). This in turn has the consequence that parts of the fastening element (22), in particular the screw head, remain visible in the so-called concrete pattern in the specific application.

FIGS. 6 and 7 each show variants (compared with FIG. 4) in the corresponding application of a formwork system (1) according to the invention. The embodiment according to FIG. 6 illustrates a double-sided connection of the formwork system (1) according to the invention with (a subregion of) the substructure (30), which is particularly advantageous on account of the symmetrical force dissipation. With this embodiment it is imperative that at least two shaped elements (10) are attached to the rear side (4) of the form lining (2). The two shaped elements (10) are preferably attached to the rear side (4) of the form lining (2) in such a way that they are positioned symmetrically, preferably in mirror-inverted manner, with respect to the (corresponding subregion of the) substructure (30). As already mentioned above, the substructure (30) can be made of any desired material, in particular of wood, and/or the substructure (30) itself can in turn be built up from a plurality of fragments, with the result that the substructure (30) touches the form lining (2) at two or more points, as shown in FIG. 6 analogously for a single subregion of the substructure (30). If the substructure (30) touches the form lining (2) in its rear side (4) at two or more points, the respective subregions of the substructure (30) can likewise be connected to (at least) two shaped elements (10), which are attached to the rear side (4) of the form lining (2). The rule of thumb that applies to this embodiment is that, for each contact region of the substructure (30) with the rear side (4) of the form lining (2), double the number of shaped elements (10) are attached there.

The shaped elements (10) in this embodiment can be the same or different, with preferably the same shaped elements (10) being used per pair of shaped elements. The shaped elements (10) used in the embodiment according to FIG. 6 can correspond, for example, to those shaped elements as are shown by way of example in FIG. 1, that is to say shaped elements (10) which have an opening (11), in particular a hole, in order to guide through a first fastening element, such as for example a cable, wire or steel strip. However, it is also possible to use shaped elements (10) which do not have an opening (11), since, for example, strips can also be fastened to the shaped element (10) via another fastening means, such as a screw.

In the embodiment according to FIG. 6, a strip (25) is used by way of example as first fastening element, which strip can also be configured, for example, in the form of a perforated strip. This first fastening element, in particular the strip (25), preferably also has a tensioning mechanism (24), which can preferably be tightened using an eccentric. If the two shaped elements (10) do not have a separate opening (11), the first fastening element can also be fastened to the respective shaped element (10) using a (respective) second fastening element, for example using a nail or a screw. The fastening to the substructure (30) can be carried out in any manner known to a person skilled in the art. Thus, for example, the substructure (30) can also have a suitable opening through which the first fastening element is pulled in order to allow a double-sided connection, as shown in FIG. 6. Alternatively, it is also possible for the substructure (30) to have suitable cutouts/geometric shapes on its lateral surfaces, into which the corresponding first fastening elements, in particular a strip, can be inserted in a form-fitting manner.

As in the embodiment variant of the present invention shown in FIG. 7, the formwork system (1) according to the invention is connected to the substructure (30), which can in particular be produced from wood, using at least one functional element (40). The functional element (40) is preferably fastened on one side (of a subregion) of the substructure (30) using at least one first fastening element, for example at least one screw (22). The specific configuration of a functional element (40) is shown by way of example in FIGS. 8a and 8b (see also the following statements). The dashed line of the form lining boundary in the embodiment according to FIG. 7 indicates that preferably in the formwork system (1) according to the invention the form lining (2) and the at least one shaped element (10) which is attached to the rear side (4) of the form lining (2) are produced by a common 3D printing method. As can be seen from this embodiment, it is not absolutely necessary for the shaped element (10) as such to have to have an opening (11), in particular in the form of a hole. For example, it is possible that the functional element (40) touches the shaped element (10) and is fastened to the shaped element (10) with the aid of a further fastening element, such as for example at least one screw (22).

The connection of the functional element (40) with the shaped element (10) in the embodiment of the following invention as described according to FIG. 7 is preferably carried out in the manner as shown by way of example in FIG. 8C. Here, the shaped element (10) has a corresponding opening (11), in particular in the form of a cutout, which, in terms of its geometry, has the counterpart (in the sense of the key-lock principle or key-lock mechanism) to the corresponding lower part (42), which is shown in the embodiment of a functional element (40) according to FIGS. 8A and 8B. The shaped element (10) and the functional element (40) thus jointly form a form fit. For the sake of completeness, it should be noted that this form fit is indeed present in this embodiment according to FIG. 7, but has not been shown graphically. With regard to the specific configuration of this form fit, reference is made to the illustration according to FIGS. 8A to 8C.

In the embodiment shown according to FIG. 7, the preferred one-sided connection between the substructure (30) and the formwork system (1) is shown using a functional element (40). Alternatively, a double-sided connection can also be carried out for this purpose, with the result that, analogously to the embodiment according to FIG. 6, a second shaped element (10), which is in turn connected to the substructure (30) via a corresponding functional element (40), is attached to the rear side (4) of the form lining (2) symmetrically, preferably in a mirror-inverted manner, with respect to the corresponding subregion of the substructure (30). As an alternative to this, it is further possible for the functional element (40) also to be attached obliquely to the substructure (30), with the result that bracing during the screwing operation is possible.

As already mentioned above, FIGS. 8A and 8B show a preferred embodiment of a functional element (40) which can be used in the embodiment according to the invention according to FIG. 7. FIG. 8A shows a schematic diagram of the functional element (40) in a front view, while FIG. 8B shows a corresponding perspective illustration of the functional element (40). The specific geometry and/or size of the functional element (40) can ultimately be chosen arbitrarily in practice; they are generally based on the specific practical application. The functional element (40) shown by way of example in FIG. 8 has a lower part (42) and an upper part (43). The lower part (42) is preferably geometrically configured in such a way that it can be introduced in a form-fitting manner into a corresponding opening (11) of a shaped element (10) attached to the rear side (4) of the form lining (2) in the formwork system (1) according to the invention. This is shown graphically in FIG. 8c. The specific geometric configuration of the subregion of the functional element (40) or of the corresponding lower part (42) that generates the form fit can be implemented in any desired manner. Thus, it is conceivable that only parts of the lower part (42) are introduced in a form-fitting manner into the corresponding opening (11) of a shaped element (10) and/or that further geometrical shapes are present on the lower part (42) that may possibly allow better and/or additional interlocking with the shaped element (10) (see also upper part of FIG. 9).

The functional element (40) can preferably have one or more openings, in particular holes (41), in order to fasten the corresponding functional element (40) to the substructure (30), for example using a suitable fastening element, in particular a screw. Such openings, in particular holes (41), are preferably present in the upper part (43) of the corresponding functional element (40). These openings, in particular holes (41), are preferably arranged symmetrically to one another. The functional element (40) can optionally also be produced by a 3D printing method.

FIG. 9 shows a special embodiment of a shaped element (10) as such in the form of a so-called "dovetail". In other words, this means that the shaped element (10) has an opening (11) which has a cutout in the form of a dovetail. Through this opening (11) of the shaped element (10) there is thus produced a form-fitting bond with, in particular, a functional part (40), as is shown, for example, in FIG. 8. FIG. 9 is, in principle, a perspective illustration of the upper part of the front view according to FIG. 8C. In the upper part of FIG. 9, two alternative configurations are shown schematically in the middle and on the right with regard to possible form fits compared with the dovetail configuration (FIG. 9, top left). For the sake of completeness, it should be noted that in FIG. 9 the form lining (2) of the formwork system (1) according to the invention is not graphically shown, but only the shaped element (10) as such, which is attached according to the invention to the rear side (4) of the form lining (2). The shaped element (10) as such shown specifically in FIG. 9 along with all geometric modifications thereof are produced by a 3D printing method and, following the 3D printing method, can be attached to a form lining (2), also produced using a 3D printing method, on its rear side (4). Preferably, within the scope of the present invention, the form lining (2) contained in the formwork system (1) according to the invention and the at least one shaped element (10) are produced by a common 3D printing process (not shown in FIG. 9).

Variants of the specific geometric configuration of a shaped element (10) according to FIG. 9 are shown in FIGS. 10A and 10B. The shaped element (10) according to FIG. 10A has an opening (11), which is preferably configured in the form of a hole. (A part of) a fastening element (in particular a wire (21)) can be plugged through this opening (11) in order to connect the shaped element (10), for example, to (the part of) a substructure (30), as has already been shown by way of example in FIG. 4. An alternative geometric arrangement of a shaped element (10) is shown in FIG. 8B, which has two openings (11), preferably in a symmetrical arrangement, through which a fastening element can also be guided. As shown on the right-hand side of FIG. 10B, a wire is particularly suitable as fastening element, which is guided at both of its ends respectively into one of the two openings (11) of the shaped element (10) (direction I) or can also be guided out again (direction II), as shown in the right-hand part of FIG. 10B.

As an alternative to using a fastening element, as shown graphically in FIG. 10A and FIG. 10B using a wire (21), it is also possible in the embodiment according to FIG. 10 that the corresponding shaped element (10) is fastened to (a subregion of) a substructure (30) using a functional element (40) analogously to the embodiments shown in FIGS. 7 and 8. The functional element (40) is in turn configured on its underside in such a way that it is matched to the corresponding opening (11) of the respective shaped element (10) according to FIGS. 10A and 10B in a form-fitting manner in the sense of a form fit (key-lock principle).

A further embodiment of the formwork system (1) according to the invention using a perforated strip (27) as second fastening element is shown in FIG. 11. FIG. 11 shows a preferred double-sided connection of a formwork system (1) according to the invention, which comprises a form lining (2), at least two shaped elements (10) being attached to the rear side (4) of the form lining (2). In order to be able to better explain the principle of fastening the perforated strip (27) in the context of this embodiment, the shaped element (10) is shown rotated at an angle of 90° in the diagram according to FIG. 11. The two shaped elements (10) are preferably arranged symmetrically to the substructure (30), in particular in a mirror-inverted manner. The first fastening element of this embodiment is preferably a perforated strip (27), which in turn is fastened to the shaped element (10) with a second fastening element (in particular a bolt (26)), which is preferably guided through one or more openings (11) of the shaped element (10) and the perforated strip (27). In the right-hand part of the illustration according to FIG. 11, the force F indicates that the perforated strip is first of all stretched in order to be able to fasten it, preferably in taut form, to the substructure (30) with the aid of a further fastening element, in particular a screw (22). The left-hand part of FIG. 11 shows this embodiment in the closed/fastened form, that is to say that the formwork system (1) according to the invention is fixedly connected to the corresponding substructure (30) using a perforated strip (27) as first fastening element and using the additional fastening elements bolt (26) and screw (22). By contrast, the right-hand part of this embodiment according to FIG. 11 shows the second part of the double-sided connection in the still unfastened state. It is of course also possible to carry out this embodiment only in the form of a one-sided fastening. In the case of this variant, the right, currently still unfastened part of FIG. 11 would simply be omitted.

A variant of the fastening shown in FIG. 11 with the aid of a perforated strip is shown in FIG. 12. In this embodiment, the shaped element (10) has as opening (11) a slot through which the perforated strip (27) is plugged. Here, the perforated strip (27) is applied in such a way that the respective ends are connected to one another with the aid of a suitable fastening element, in particular a screw (22). In this way, the perforated strip is thus doubled, which has the effect of reinforcing the fastening. The corresponding fastening element of the perforated strip, in particular the screw (22), can additionally be used to attach the perforated strip (27) to the substructure (30) at the same time. Alternatively, it is also conceivable to fasten the perforated strip (27) to the substructure (30) with a separate fastening element, in particular a further screw (22).

A preferred embodiment of the formwork system (1) according to the invention is shown in FIG. 13. What is concerned here is a so-called "snap connection", in particular a releasable snap connection. In FIG. 13, the formwork system (1) according to the invention has two shaped elements (10) which preferably have an identical shape and size. Furthermore, the two shaped elements (10) are attached to the rear side (4) of the form lining (2) symmetrically, in particular in a mirror-inverted manner, with respect to (in particular) the substructure (30). The two shaped elements (10) are movable (at least to a certain extent) because they can be reversibly pressed apart by a suitable object, preferably by a functional element (40) or a substructure (30), in particular by a substructure (30). This is shown by the direction of movement I in FIG. 13. The formwork system (1) according to the invention is preferably fastened directly to (a subregion of) the substructure (30); optionally, the fastening can also occur using the same mechanism on a functional element (40), which in turn is itself fastened to a corresponding substructure (30), as has been shown above by way of example in FIG. 7. Preferably, within the scope of the present invention, the fastening of the formwork system (1) according to the invention is effected directly on (a subregion of) the substructure (30). It is of course possible for the formwork system (1) according to the invention to be analogously fastened to the substructure (30) at two or more points, that is to say at different subregions.

According to the invention, the formwork system (1) according to the invention can be pressed against the substructure (30) or, optionally, the functional element (40). Alternatively, however, the substructure (30) can also be pressed against the formwork system (1) according to the invention, as shown graphically in FIG. 13. According to the invention, the lighter and/or more movable part is preferably pressed against the heavier and/or more immovable part, with it being the case in practice that the substructure (30) is frequently more immovable and/or heavier as compared with the formwork system (1) according to the invention. Alternatively, it is also possible for both elements to be pressed against one another at the same time.

As can also be seen from FIG. 13, in this embodiment the substructure (30) has a cutout (31) at height H, into which the shaped element (10) can latch in the sense of a snap connection. The corresponding point of the shaped element (10), which can latch into the cutout (31) of the substructure (30), is also referred to as a latching lug (13) or a lug or projection. For clarification, the mode of operation of the snap mechanism is identified in FIG. 13 in the lower part by the asterisk and the direction of movement I, in the upper part also by the asterisk and by the direction of movement II. At the position of the asterisk in the upper part of FIG. 13, for example, the two latching lugs (13) of the respective shaped elements (10) can touch.

By virtue of the relative movability of the two shaped elements (10), the snap connection can also be released again by a corresponding exertion of force, that is to say the substructure (30) can be pulled out again from the formwork system (1) according to the invention or vice versa, which enables reusability of the respective components. If in this embodiment the formwork system (1) according to the invention is intended to be connected to a functional element (40) and not to the substructure (30), the system functions analogously. In this embodiment, the functional element (40) likewise has a cutout (44) at the corresponding point, which enables the snap connection to latch in an analogous manner.

A variant/special embodiment of the snap connection according to FIG. 13 is shown schematically in FIG. 14. The cutouts contained in the substructure (30) are shown in FIG. 14 as milled slots (32). This can be a single milled slot (32); it is also conceivable that two or more such slots are present rectilinearly or in some other geometric arrangement in the substructure (30). The number and/or arrangement of the milled slots (32) is selected to be compatible with the corresponding geometric shape of the shaped element (10). In the lower part, on the right of FIG. 14, a shaped element (10) is shown schematically. With its latching lug (13), the shaped element (10) can latch in the milled slot (32), in particular latch in reversibly. In FIG. 14, bottom center, it is shown how the shaped element (10) is to be positioned relative to the substructure (30) in order that a snap connection, in particular in reversible form, between the formwork system (1) according to the invention via its shaped element (10) and the substructure (30) via its milled slot (32) is possible.

In FIG. 14, there are by way of example four different milled slots contained in the substructure (30). This means that the respective counterpart in the shaped element (10) is present in the corresponding points and taking into account the corresponding geometry on the formwork system (1) according to the invention in order to enable a snap connection. Here, in the present scenario, four different shaped elements (10) can be attached to the rear side (4) of the formwork system (2), each of which latch separately from one another into the corresponding number of milled slots (32). Alternatively, it is also possible that this is a single shaped element (10) that has four different latching lugs (13) which can latch into the respective milled slots (32) at the corresponding points. In this way, a particularly stable connection can be established. Alternatively, it is of course also possible that the corresponding counterpart in the form of a shaped element (10) with a latching lug (13) latches via a snap connection only at one of the four slots (32) milled schematically in FIG. 14, whereas no fastening occurs at the other milled slots (32). This can be the case, for example, when the corresponding substructure parts (30) are produced in very large numbers and an exact positioning of the connection with the shaped element (10) is to be configured to be as variable as possible.

In the case of the embodiments according to FIG. 13 and in particular FIG. 14, from the technical point of view it is also possible that only a one-sided snap connection takes place. In practice, however, this embodiment is preferably carried out with a double-sided snap connection as shown in FIG. 13, because in this way the substructure (30) or optionally a functional element (40) can be connected to the formwork system (1) according to the invention in a more stable manner (as compared with a pure one-sided snap connection). However, the one-sided snap connection can become important when different types of fastening are combined. For example, it is possible by way of the simple latch-in connection first of all to ensure correct positioning of the form lining (2) on the substructure (30). Elements which can build up higher forces (for example perforated strip) are then used to ensure the actual, substantially more rigid and stable positioning.

LIST OF REFERENCE SIGNS 1 formwork system
2 form lining
3 front side (of the form lining)
4 rear side (of the form lining)
10 shaped element
11 opening
12 reinforcing ribs
13 latching lug
20 second fastening element (for example for attaching the shaped element to the substructure)
21 wire
22 screw
23 screw hole
24 tensioning mechanism
25 strip
26 bolt
27 perforated strip
30 substructure
31 cutout
32 (milled) slots
40 functional element
41 hole
42 lower part
43 upper part
44 cutout
50 first fastening element (for example for attaching the shaped element to the form lining)

The invention claimed is:

1. A formwork system (1) for the production of structural elements made of concrete comprising
a form lining (2) which has a front side (3) and a rear side (4),
at least one shaped element (10) which is attached to the rear side (4) of the form lining (2),
wherein i) the form lining (2) and the shaped element (10) have been produced by a 3D printing method, ii) the shaped element (10) is attached to the rear side (4) of the form lining (2) optionally using at least one first fastening element, and iii) the shaped element (10) and optionally the first fastening element are attached to the rear side (4) of the formwork lining (2) in such a way that the shaped element (10) and the optionally used first fastening element do not touch or pierce the front side (3) of the form lining (2), wherein the formwork system (1) is fastened to at least one subregion of a substructure (30) using at least one second fastening element, wherein the substructure (30) is completely produced from wood, wherein
the at least one shaped element (10) has at least one opening (11), in the form of a round hole or a slot, and at least one first second fastening element, in the form of a wire (21), a cable or a steel strip, is inserted, by way of one subregion thereof, into the opening (11) or partially pulled through, and the first second fastening element is fastened, by way of another subregion thereof, to the substructure (3 0) using at least one second second fastening element, selected from the group consisting of a screw or a nail.

2. The formwork system (1) according to claim 1, wherein the form lining (2) and the at least one shaped element (10) have been produced in a 3D printing process.

3. The formwork system (1) according to claim 1, wherein the form lining (2) and the at least one shaped element (10) have each been produced in separate 3D printing processes, and the shaped element (10) is then attached to the rear side (4) of the form lining (2) using at least one first fastening element.

4. The formwork system (1) according to claim 3, wherein the at least one shaped element (10) is attached to the rear side (4) of the form lining (2) by adhesive bonding, screwing, nailing and/or riveting, and/or, as first fastening element, adhesive, screws, nails and/or rivets are used.

5. The formwork system (1) according to claim 1, wherein the at least one shaped element (10)
i) has at least one opening (11), in the form of a round hole, a slot or a cutout, or
ii) has at least one latching lug (13), or
iii) has at least one reinforcing rib (12).

6. The formwork system (1) according to claim 1, wherein the substructure (30) is a wooden lattice construction or a cleat construction.

7. A method comprising utilizing the formwork system (1) according to claim 1 in concrete construction or for the production of structural elements made of concrete, wherein the front side (3) of the form lining (2) is the side of the formwork system (1) facing the concrete.

* * * * *